United States Patent [19]

Yamada

[11] 4,311,008
[45] Jan. 19, 1982

[54] EXHAUST BYPASS TYPE TURBO-CHARGER

[75] Inventor: Koichiro Yamada, Ibaraki, Japan
[73] Assignee: Hitachi, Ltd., Tokyo, Japan
[21] Appl. No.: 109,113
[22] Filed: Jan. 2, 1980

[30] Foreign Application Priority Data

Jan. 10, 1979 [JP] Japan .................................. 54-678

[51] Int. Cl.³ ............................................ F02B 37/00
[52] U.S. Cl. ..................................... 60/602; 137/503
[58] Field of Search ................. 60/600, 601, 602, 603; 137/503; 417/46, 47

[56] References Cited
U.S. PATENT DOCUMENTS 2,374,708  5/1945  Shoults ............................ 60/602 X
3,270,951  9/1966  Reed ................................ 60/602 X Primary Examiner—Michael Koczo, Jr.
Attorney, Agent, or Firm—Craig and Antonelli

[57] ABSTRACT

An exhaust bypass type turbo-charger includes a turbine driven by an exhaust gas from an internal combustion engine, a compressor driven by the turbine and supplying a compressed air into the engine, an exhaust bypass valve for controlling an amount of the exhaust gas bypassing the turbine, a drive mechanism for fluidly driving the exhaust bypass valve, and a transducer. The transducer communicated fluidly with both the drive mechanism and an outlet of the compressor, and amplifies the pressure variation of air discharged from the compressor so that the amplified pressure variation is applied in the drive mechanism. The drive mechanism, therefore, can start to open the exhaust bypass valve at a relatively smaller pressure, and fully open it at a relatively larger pressure.

6 Claims, 4 Drawing Figures

EXHAUST BYPASS TYPE TURBO-CHARGER

BACKGROUND OF THE INVENTION

The invention relates to a turbo-charger for compressing the air to be supplied to an internal combustion engine with the use of a compressor which is driven by a turbine turned by the exhaust gases from the internal combustion engine, and, more particularly, to an exhaust bypass type turbo-charger, in which a portion of the exhaust gases to flow into the turbine is discharged by opening an exhaust bypass valve so that the rotating conditions of the turbine may be controlled.

For the demand for reduction in size and increase in efficiency of an internal combustion engine, wide use has been made recently of a turbo-charger for compressing the supply air to the engine with the use of the exhaust gases from engine. The compressor discharge pressure of the turbo-charger has to be maintained always at a preset pressure irrespective of the running condition of the engine. In order to satisfy this requirement, in the conventional turbo-charger, the discharge pressure of the compressor is partially discharged to the atmosphere in accordance with a known system so that the pressure downstream of the discharging portion may be maintained substantially at a constant level. It is, however, found that the discharge of the pressure which is raised by having made the compressor work invites high loss. With this in mind, there has been developed the so-called exhaust bypass type turbo-charger, i.e., a turbo-charger, in which a portion of the exhaust gases are discharged to reduce the loss before the exhaust gases work or drive the turbine of the turbo-charger.

Now, in this type of the exhaust bypass type turbo-charger, for example, shown in U.S. Pat. No. 4,211,811 entitled, Exhaust Bypassing System For A Turbo-charger, the drive mechanism for opening and closing the exhaust bypass valve is controlled directly by the discharge pressure of the compressor. In this instance, it is desired that the compressor discharge pressure required of the exhaust bypass type turbo-charger has the characteristics that they are maintained as constant as possible from the time the bypass valve begins to be opened to the time the same is opened to its full stroke. However, the direct control of the drive mechanism by the compressor discharge pressure cannot effect, on principle, the control required at the constant compressor discharge pressure but can effect the control the compressor discharge pressure in proportion to the running condition of the engine because the drive mechanism is operated in proportion to the change in the compressor discharge pressure. As a result, the maximum of the compressor discharge pressure that is allowable from the standpoint of the mechanical strength of the engine is determined (generally at about 650 mm Hg in gauge pressure) so that the bypass valve may be fully opened at that time. With the bypass valve being fully opened, on the other hand, in order that the difference between the inside and outside of the bellows or the like of the drive mechanism may be such a pressure difference (generally at 200 mm Hg) as can ensure sufficient operation of the drive mechanism, the compressor discharge pressure at the beginning of the opening operation of the bypass valve has to be considerably reduced to a lower level than the pressure when the bypass valve is fully opened. As a result, there arises a disadvantage that the compressor discharge pressure at the beginning of the bypass valve opening operation becomes lower than the level required so that the drivability of the engine is accordingly deteriorated. As described hereinabove, since the working pressure of the drive mechanism has to be set as low as at 200 mm Hg, the spring constant of the drive mechanism has to be as low as possible. As a result, the drive mechanism is liable to become so instable that it is vibrated by the vibrations of a vehicle thereby to have its operations instabilized, and the drive mechanism has its intrinsic vibration frequency because of the minimized spring constant so that it becomes liable to be vibrated in response to the vibrations of the vehicle. In either event, another disadvantage resides in fact that the drive mechanism has its operating characteristics remarkably handicapped.

SUMMARY OF THE INVENTION

It is therefore an object of the invention to provide an exhaust bypass type turbo-charger which can minimize the variation in the compressor discharge pressure from the time the bypass valve begins to be opened to the time the same is fully opened.

Another object of the invention is to provide an exhaust bypass type turbo-charger which can make the compressor discharge pressure substantially uniform at a compressor discharge pressure more than a predetermined value under a stable operation.

According to the invention, a transducer for amplifying the discharge pressure variation of a compressor at a preset amplification rate is disposed on a passage, through which the compressor discharge pressure is introduced into the drive mechanism of an exhaust bypass valve so that the drive mechanism may be fully operated in response to the small variation in the compressor discharge pressure by making use of the fact that the compressor discharge pressure variation can be controlled at a desired proportional amplification rate by the transducer.

DESCRIPTION OF THE PREFERRED EMBODIMENT

An embodiment of an exhaust bypass type turbo-charger according to the invention will now be described with reference to the accompanying drawings.

Figure 1:
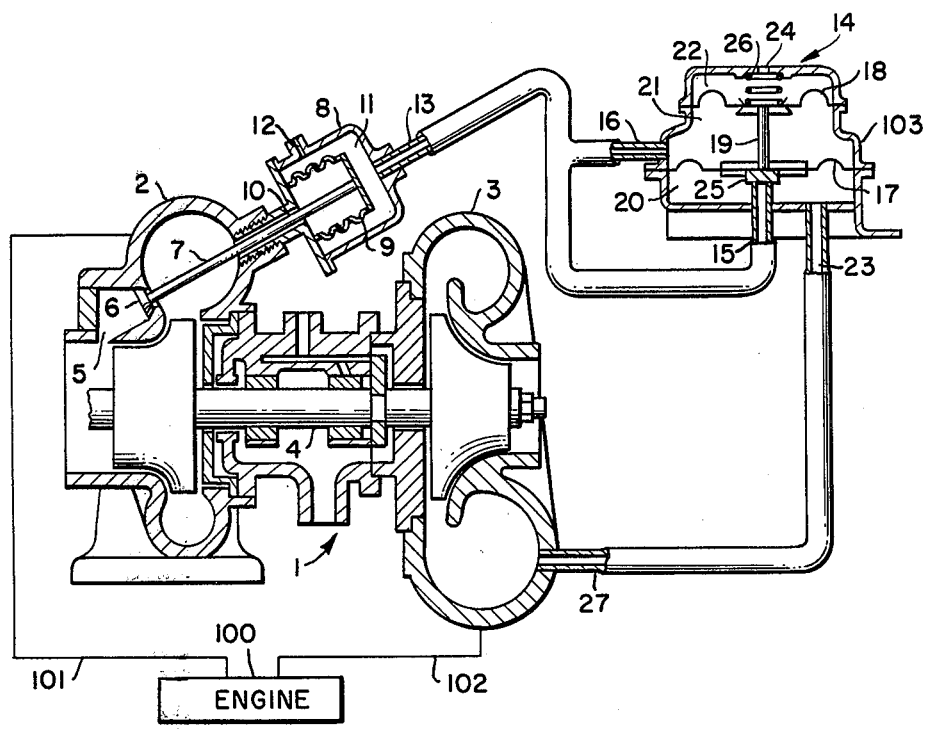
FIG. 1 is a sectional view showing one embodiment of an exhaust bypass type turbocharger according to the invention.

Referring to FIG. 1, a turbo-charger generally designated by the reference numeral body 1 is equipped with a turbine 2 and a compressor 3, the impellers of which are connected by means of a shaft 4. The turbine 2 communicates with an internal combustion engine 100 through an exhaust induction passage 101, and the compressor 3 communicates with the engine 100 through a discharge passage 102. At the inlet side of the turbine 2, there is disposed an exhaust bypass valve 6 for discharging a portion of the exhaust gases, which is to flow into the turbine 2, into a bypass passage 5 while bypassing the turbine 2. The bypass valve 6 has its rod 7 extending to the outside through the casing of the turbine 2 until it is fixed to the head of a bellows 9 which is mounted in a bypass valve drive mechanism 8. The bellows 9 has its open end fixed to the inner side of the drive mechanism 8 and has its inside communicating with the inside of the turbine 2 through a communication hole 10. On the other hand, a working pressure chamber 11, which is formed around the bellows 9, communicates with the atmosphere through an orifice 12 and communicates with outlet pipes 15 and 16 of a transducer generally designated by the reference numeral 14 through a pipe 13.

The transducer 14 is equipped in its inside with a first diaphragm 17 having a larger effective pressure receiving area and a second diaphragm 18 having a smaller pressure receiving area. Both of the diaphragms 18, 19 are connected by a rod 19 such that they can move together. The inside of the transducer 14, defined by a casing 103, is divided by the first and second diaphragms 17 and 18 into three chambers 20, 21 and 22. The outlet pipe 15 and an inlet pipe 23 open into the first chamber 20 defined between the first diaphragm 17 and the casing 103 of the transducer 14. The outlet pipe 16 open into the second chamber 21 defined between the first and second diaphragms 17 and 18. The third chamber 22, defined between the second diaphragm 18 and the casing 103, is vented to the atmosphere through a vent hole 24. A seat is fixed on a side of the first diaphragm 17 facing the outlet pipe 15 seat 25 is always biased through the first and second diaphragms 17, 18 and the rod 19 so as to shut off the outlet pipe 15 by the action of a set spring 26 mounted in the third chamber 22 between the second diaphragm 18 and the casing 103.

The inlet pipe 23 of the transducer 14 communicates with the discharge side of the compressor 3 through a pipe 27 so that the discharge pressure of the compressor 3 can be introduced through the inlet pipe 23 into the first chamber 20 of the transducer 14.

The present embodiment described hereinabove operates in the following manner.

In FIG. 1, when the exhaust gases of the engine 100 are supplied to the turbine 2 so that the turbine 2 is driven, the compressor 3 is driven through the shaft 4. The discharge pressure generated by this drive of the compressor 3 is transmitted through the pipe 27 and the inlet pipe 23 to the first chamber 20 of the transducer 14. While this discharge pressure is at a low level, the outlet pipe 15 is shut off by the seat 25 so that the discharge pressure of the compressor 3 is not transmitted to the working pressure chamber 11 of the drive mechanism 8 of the exhaust bypass valve 6.

Next, when the engine speed is increased so that the R.P.M. of the turbine 2 is accordingly increased to raise the discharge pressure of the compressor 3, the first and second diaphragms 17 and 18 are moved upward against the biasing force of the set spring 24 to open the outlet pipe 15 so that the varied discharge pressure is transmitted through the pipe 13 to the inside of the working pressure chamber 11. As a result, the exhaust bypass valve 6 is opened by the difference in the exhaust gas pressure between the inside of the working pressure chamber 11 and the inside of the bellows 9. As a result, the exhaust gases are partially discharged into the bypass passage 5 so that the force for driving the turbine 2 is weakened to lower the discharge pressure of the compressor 3. Then, the pressure in the first chamber 20 of the transducer 14 is lowered so that the seat 25 is brought into close contact with the outlet pipe 15 by the biasing force of the set spring 26. On the other hand, the pressure remaining in the working pressure chamber 11 is gradually released to the outside through the orifice 12, until the pressure difference through the bellows 9 is reduced to zero by the release, so that the bellows 9 is allowed to be restored to its extended position to thereby shut off the exhaust bypass valve 6.

If the exhaust bypass valve 6 is closed then the R.P.M. of the engine 100 becomes high, the discharge pressure of the compressor 3 is boosted again so that the foregoing operations are repeated to maintain the discharge pressure at a preset level. In this meanwhile, the variation in the discharge pressure is so amplified at a preset amplification rate by the action of the transducer 14 that the drive mechanism 8 can be actuated by a slight variation.

Figure 2:
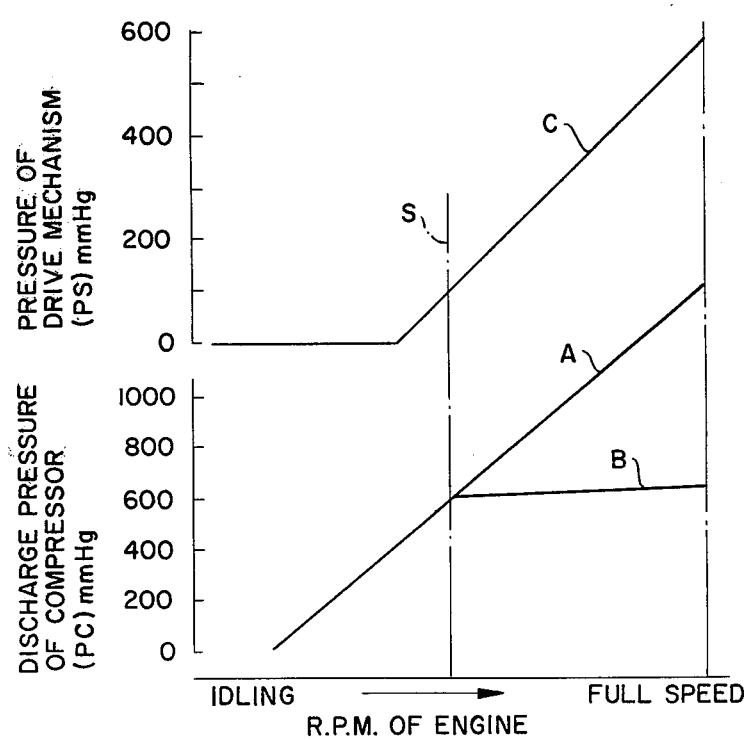
FIG. 2 is a graphical presentation plotting the characteristic lines of the compressor discharge pressure and the drive mechanism pressure required against the R.P.M. of the engine.

FIG. 2 plots the relationships between the R.P.M. of the engine 100 and the pressure PS (mm Hg) of the drive mechanism 8 and between the R.P.M. of the engine 100 and the discharge pressure PC of the compressor 3. Characteristic line A indicates the compressor discharge pressure PC in case the exhaust bypass valve 6 is forcibly held under its fully closed condition, whereas characteristic line B indicates the compressor discharge pressure PC which is required when the exhaust bypass valve 6 is operated. The shown example corresponds the characteristics, in which the bypass valve 6 begins to be opened at the discharge pressure PC of 600 mm Hg and is fully opened at the discharge pressure PC of 650 mm Hg.

On the other hand, characteristic line C indicates the pressure PS which is to be fed to the pipe 13 of the drive mechanism 8 so that the compressor discharge pressure PC may be controlled from the level of 600 mm Hg to the level 650 mm Hg, as has been described in the above. In this example, the exhaust bypass valve 6 begins to be opened at the pressure PC of 100 mm Hg and is fully opened at the pressure of 600 mm Hg. Incidentally, straight line S shown in dotted form indicates the operation starting point of the drive mechanism 8.

Now, if the effective pressure receiving areas of the diaphragms 17 and 18 of the transducer 14 are denoted at letters $A_L$ and $A_S$ and if the load upon the set spring 26 is denoted at letter W, the balance of the transducer 14 is expressed by Equation (1):

$$\frac{PC}{760} \times A_L + \frac{PS}{760} \times A_S - \frac{PS}{760} \times A_L - W = 0, \quad (1)$$

wherein it is assumed that the force to be imparted to the seat 25 can be omitted by sufficiently reducing the seat area.

If Equation (1) is reformed and rearranged, Equation (2) can be obtained, as follows:

$$PS = \frac{A_L}{A_L - A_S} PC - \frac{760}{A_L - A_S} W. \quad (2)$$

From Equation (2), it is understood that the pressure PS is varied such that the term $$\frac{A_L}{A_L - A_S} PC$$

is varied at the rate of value $$\frac{A_L}{A_L - A_S}$$

to the variation in the value PC; whereas, the term $$\frac{760}{A_L - A_S} W$$

is a constant. In other words, it is understood that the pressure PS can be set at any value for the variation in the pressure PC by suitably selecting the pressure receiving areas of the diaphragms.

According to the above example, trial preparation is made of the specifications of the first and second diaphragms 17 and 18. If the pressure PS=100 mm Hg for the pressure PC=600 mm Hg is substituted into Equation (2) in accordance with the operating conditions of the drive mechanism 8, then Equation (3) can be obtained, as follows:

$$100 = \frac{A_L}{A_L - A_S} \times 600 - \frac{760}{A_L - A_S} W. \quad (3)$$

If the pressure PS=600 mm Hg for the pressure PC=650 mm Hg is substituted, then Equation (4) can be obtained, as follows:

$$600 = \frac{A_L}{A_L - A_S} \times 650 - \frac{760}{A_L - A_S} W. \quad (4)$$

If Equations (3) and (4) are substituted and rearranged, Equation (5) can be obtained, as follows:

$$A_L = \frac{10}{9} A_S. \quad (5)$$

If, for instance, the area $A_S = 9$ cm$^2$ is selected, the area $A_L = 10$ cm$^2$ and the load $W = 7.7$ kg can be calculated.

In this instance, when the discharge pressure PC of 600 mm Hg is introduced into the first chamber 20 of the transducer 14, the outlet pipe 15 is opened to introduce the discharge pressure into the second chamber 21, then the outlet pipe 15 is closed. As a result, the pressure PS in the working pressure chamber 11 becomes about 100 mm Hg to thereby slightly open the exhaust bypass valve 6. When the discharge pressure is 650 mm Hg, the outlet pipe 15 is opened for a period of time longer than with a pressure PC of 600 mm Hg. As a result, the valve 6 is fully opened with the pressure PS becoming 600 mm Hg.

Figure 3:
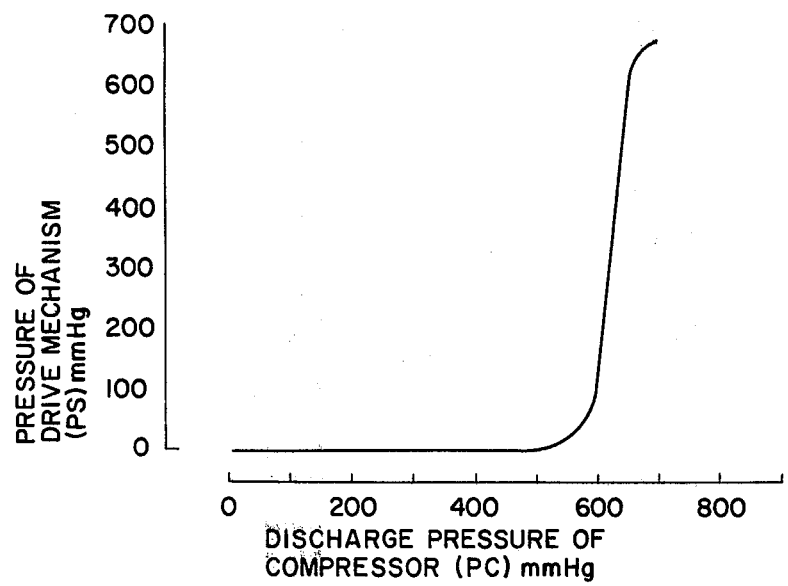
FIG. 3 is a graphical presentation plotting the characteristic curve of the drive mechanism pressure against the compressor discharge pressure according to the embodiment of the invention.
Figure 4:
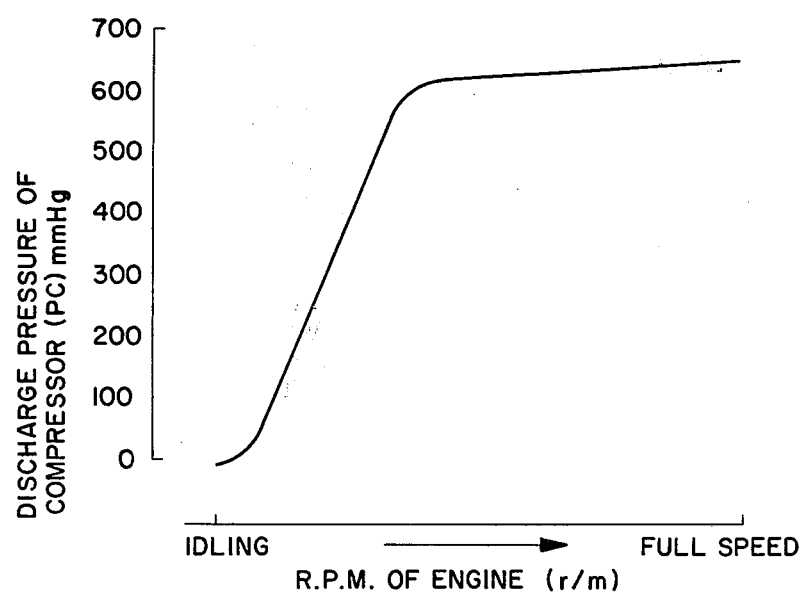
FIG. 4 shows the supercharging characteristics of the engine under the condition corresponding to FIG. 3.

FIG. 3 plots the relationship of the pressure PS with the pressure PC in case the embodiment of the present invention is put into practice. In view of FIG. 3, it is understood that the drive mechanism pressure PS is hardly raised for the compressor discharge pressure equal to or lower than 550 mm Hg and that the drive mechanism 8 can accomplish its fully opening drive for a slight variation in the compressor discharge pressure, e.g., about 50 mm Hg. FIG. 4 plots the supercharging characteristics at that time. It is understood from FIG. 4 that the discharge pressure PC is raised at a slight rate up to the maximum 650 mm Hg even when the engine reaches its full speed condition after the R.P.M. of the engine becomes higher than a preset level so that the compressor discharge pressure exceeds the value 600 mm Hg.

As has been described hereinbefore, according to the present invention, since the pressure variation for bringing the exhaust bypass valve 6 into operation can be elevated to e.g., 500 mm Hg, the spring constant of the drive mechanism 8 can be set such a high level that a metal bellows or the like having the highest heat resisting property can be employed to prevent the resonance. Since, moreover, the fluctuation in the controlled compressor discharge pressure PC can be reduced to a level of 50 mm Hg at the highest, a substantially uniform high supercharging pressure can be supplied irrespective of the R.P.M. of the engine, in case the vehicular speed is higher than a preset level, so that the drivability of the engine can be remarkably improved together with the fuel economy for the low and medium speed ranges of the engine.

Still moreover, although, in the aforementioned embodiment, the foregoing description is directed to the construction, in which the transducer is of the type using two diaphragms, the present invention should not be limited to such construction but can be extended to other types such as a differential piston type, in which a single piston is formed with different faces having different pressure receiving areas. In short, it is sufficient that the construction to be employed in the present invention can control the compressor discharge pressure in an amplified manner.

As has been described in the above, the present invention can attain the advantage that the fluctuation of the compressor discharge pressure for the fully opened operation of the exhaust bypass valve can be reduced to a markedly low level.

What is claimed is:

1. An exhaust bypass type turbo-charger comprising:
   a turbine driven by an exhaust gas introduced from an internal combustion engine into the interior of said turbine through an exhaust introduction passage;
   a compressor operatively connected to said turbine so as to be driven by said turbine, said compressor communicating with said engine through a discharge passage to supply air into said engine;
   an exhaust bypass passage communicating with said exhaust introduction passage for causing a portion of exhaust gas from said engine to bypass said turbine;
   an exhaust bypass valve for controlling an amount of exhaust gas passing through said exhaust bypass passage;
   a drive mechanism operatively connected to said exhaust bypass valve for driving said exhaust bypass valve in response to the pressure introduced in said drive mechanism; and
   a transducer fluidly communicating with both said discharge passage and interior of said drive mechanism for amplifying the pressure variation in said discharge passage and introducing the pressure amplified in its variation into the interior of said drive mechanism so that said exhaust bypass valve is driven in response to the amplified pressure variation.

2. The exhaust bypass type turbo-charger as defined in claim 1, wherein said drive mechanism comprises a casing with an orifice, and a bellows disposed in said casing, one end of said bellows being fixed to said casing and the other end to said exhaust bypass valve through a rod means so that said exhaust bypass valve will be moved according to movement of said bellows, said bellows and said casing defining therebetween a working pressure chamber communicating with atmosphere through said orifice.

3. The exhaust bypass type turbo-charger as defined in claim 2, wherein the interior of said bellows communicates with said exhaust induction passage so that said exhaust bypass valve is urged to close by pressure applied in said bellows.

4. The exhaust bypass type turbo-charger as defined in claim 3, wherein said bellows is made of heat resisting alloy.

5. The exhaust bypass type turbo-charger as defined in claim 1, wherein said transducer comprises a closed casing; a first diaphragm disposed in and mounted on said closed casing for defining a expansible pressure chamber, said expansible pressure chamber having a closed valve and communicating with both said working pressure chamber of said drive mechanism through said closed valve and said discharge passage; a second diaphragm disposed in and mounted in said closed casing for defining a second pressure chamber in cooperation with a part of said closed casing and said first diaphragm, said second diaphragm having a smaller pressure receiving area than said first diaphragm and connected to said first diaphragm so as to provide the same movement as said second diaphragm, said second pressure chamber communicating with both said space of said drive mechanism and said discharge passage through said closed valve; and a spring for biasing said first and second diaphragms so that said closed valve is normally closed, an opening operation of said closed valve being effected at a pressure level more than predetermined value.

6. The exhaust bypass type turbo-charger as defined in claim 5, wherein said closed valve comprises a pipe provided on said closed casing so as to project into said first expansible pressure chamber, and a seat mounted on said first diaphragm.

* * * * *